United States Patent [19]
Eakin

[11] Patent Number: 4,844,487
[45] Date of Patent: Jul. 4, 1989

[54] LOCK-STEP DUO STEP SPLIT SEALING RING

[75] Inventor: David F. Eakin, Baltimore, Md.

[73] Assignee: Kaydon Corporation, Muskegon, Mich.

[21] Appl. No.: 267,282

[22] Filed: Nov. 4, 1988

[51] Int. Cl.⁴ .............................. F16J 9/14; F16J 9/20
[52] U.S. Cl. ...................................... 277/221; 277/222
[58] Field of Search .................................. 277/216–222

[56] References Cited

U.S. PATENT DOCUMENTS

| | | | |
|---|---|---|---|
| 1,292,101 | 1/1919 | Shaw | 277/217 |
| 1,512,393 | 10/1924 | Behnke | 277/222 |
| 1,532,547 | 4/1925 | Pruyn | 277/222 |
| 2,285,961 | 6/1942 | Finley | 277/219 |
| 2,688,522 | 9/1954 | Hoyt et al. | 277/219 |
| 4,189,161 | 2/1980 | Grimm | 277/221 |

FOREIGN PATENT DOCUMENTS 391041  4/1933  United Kingdom ............... 277/220

Primary Examiner—Robert S. Ward
Attorney, Agent, or Firm—Price, Heneveld, Cooper DeWitt & Litton

[57] ABSTRACT

A split sealing ring has a latch structure of overlapping, interengaging surfaces inclined to the ring's axis, which inclined surfaces seat against each other and intersect only the outer circumferential face of the ring and one of the axial faces of the ring at a location spaced radially outwardly from the inner radial face of the ring and the axial opening through the ring at the center of the overlap is entirely surrounded by portions of the outer circumferential face of the ring.

7 Claims, 2 Drawing Sheets

LOCK-STEP DUO STEP SPLIT SEALING RING

SUMMARY OF THE INVENTION

The invention relates to a resilient split ring the ends of which are designed to interengage and form a joint consisting of faces which nest against each other and are inclined to the ring's axis so that no surface extends radially from the inner axial surface to the outer axial surface and the only radial opening through the ring is that provided by the necessity of preventing axial interference between the latch fingers at the center of the latch area.

BACKGROUND OF THE INVENTION

The invention provides a sealing ring which may be used either as a shaft seal or a piston ring in which the joint formed by the split ends of the ring provides no axial passage and no radial passage for fluids at the split other than a very small opening at the extreme center of the ring due to the engagement between nesting surfaces which are inclined to the axis of the ring and do not intersect the inner circumferential face of the ring.

Rings have long been used to seal the clearance opening provided between a rod, shaft or a piston and its surrounding cylinder wall where a clearance, even though small, must be provided to prevent binding when one of the parts is moved relative to the other. In order to install such a ring in its ring groove, it is necessary that the ring be expanded to pass over the shaft, rod or piston on which it is to be installed. To do this, the inner diameter of the ring must be expanded which requires the ring to be split at one point. Thus, there is created the necessity of a joint. Many different constructions have been developed in the past to minimize leakage past the ring at the joint. Many of the joints, in addition, are designed to provide a lock which will detachably secure the ends of the ring together after the rings have been seated in their appropriate grooves. How the latch by which the ends of the ring are connected is designed will, in part, depend upon the use to which the ring is intended to be applied.

In almost all ring applications, one of the more difficult problems to solve is that of reducing and, to the extent possible, eliminating leakage past the ring through the gap or gaps at the joint which result from the fact that it is, as a practical matter, not possible to bring the ends of the closed ring into tight circumferential abutment due to the fact that the ring must provide a certain amount of circumferential adjustment at the splice to accommodate normal manufacturing tolerances. Further, the rings, in most circumstances, must operate through a wide temperature range which results in expansion and contraction of the ring. The necessity of allowing for thermal expansion and accommodating unavoidable tolerance variations makes the problem of controlling leakage at the ring joint or splice difficult. To effect this, many rings have been designed with the objective of making the passage for fluids at the ring joint as tortuous and indirect as possible. This procedure is complicated by the fact that in rings of the type with which this invention is concerned must provide a joint which will latch the ends together once the ring has been closed. There is also the problem of providing precisely shaped and sized surfaces which will mate with a minimum gap due to tolerance accumulation. A further limitation is that many shapes which could be devised for this purpose at the ring gap cannot be machined, cast or otherwise formed by practical means. Examples of latch structures which are difficult to manufacture and yet fail to provide essential operating characteristics are to be found in patents such as U.S. Pat. No. 2,080,935, issued May 18, 1937 to S.S. Slyk and U.S. Pat. No. 4,533,149, issued Aug. 6, 1985 to G.R. Vader. These are merely exemplary.

BRIEF DESCRIPTION OF THE INVENTION

The invention provides a ring particularly designed as a sealing ring for use in gas turbines or transmissions. Although not specifically designed for the purpose, it can be used in automotive engines where high speed reciprocation is involved. The ring has a latch structure at the split or part which, once engaged, will hold the ring in closed condition except for the final contraction necessary to seat it in the cylindrical opening which it is designed to seal. The design of the ring is such that, except for a very small radially extending opening at the center portion of the latch structure, there is no surface along which opposite ends of the latch engage each other which extends radially from the outside to the inside of the ring. Other than at the single radial gap, all of the various interengaging surfaces forming the latch are such that no surface at the splice extends from the outer surface to the inner surface. These interengaging surfaces each extend only from an axial surface to the outer radial surface. Further, the more the ring is compressed circumferentially, the more the single radial opening created between the facing portions of the overlapped ends of the ring is restricted. The result is a ring having very low leakage characteristics because this gap is largely closed by the exterior surface of the ring being resiliently pressed against and engaging the cylinder wall within which it is confined. Irrespective of the axial direction the pressure is exerted on the ring, the ring provides no open passage extending either radially from the outside to the inside or radially from the outside to either the upper or lower faces or the inside since the outer radial surface of the ring forms a seal entirely surrounding the gap which contains the single radial opening.

DESCRIPTION OF THE PREFERRED EMBODIMENT

Figure 1:
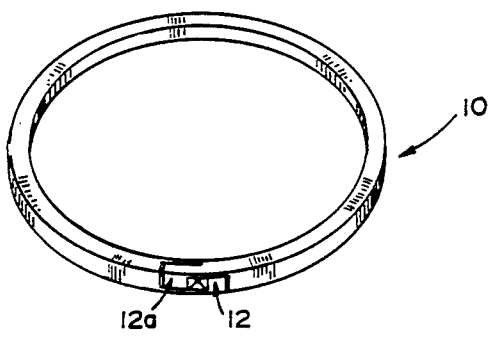
FIG. 1 is an oblique top view of a ring incorporating this invention in closed or operating position.

Referring to the drawings and particularly to FIG. 1, the numeral 10 refers to a split annular sealing ring having an interlocking joint or latch 11.

Figure 4:
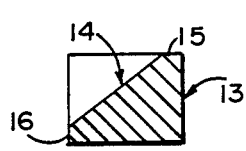
FIG. 4 is a sectional elevation view taken along the plane IV—IV of FIG. 2.

The latch has a pair of end segments 12 and 12a each having fingers and pockets which overlap and interlock when the ring is closed. The end segment 12 has a first finger portion 13 having an inclined surface 14 which extends from adjacent the inner edge of the upper axial face of the ring to the outer radial face adjacent the lower axial face (FIG. 4). Thus, there remains a circumferentially extending narrow portion 15 of the upper axial face and a similar narrow portion 16 of the outer circumferential face of the finger portion 13 (FIG. 4). While the inclination of the surface 14 is illustrated as being 45°, it will be recognized that a different angle of inclination can be utilized which will cause the width of one of the narrow portions 15 or 16 to be increased. However, it is important that the inclined surface 14 not intersect either the inner circumferential face of the ring or be so located that there is no radial spacing between it and the inner circumferential wall of the ring to create the portion 15.

Figure 6:
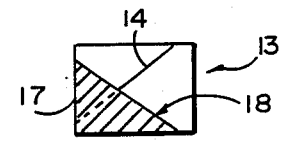
FIG. 6 is a sectional elevation view taken along the plane VI—VI of FIG. 2.
Figure 4A:
Figure 6A:
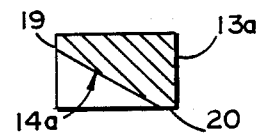
Figure 7:
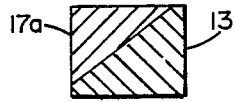
FIG. 7 is a sectional elevation view taken along the plane VII—VII of FIG. 3.

Adjacent the free end of the end segment 12 of the latch, the segment is provided with a second finger 17 having an inclined surface 18 similar to surface 14 except it faces inwardly and upwardly (FIG. 6). It intersects the outer radial face close to but spaced from the upper axial face leaving a circumferentially extending narrow portion 19 of the outer radial face of the end segment 12a intact (FIG. 6A). In a similar manner, its lower end intersects the lower axial face at a point spaced radially outwardly from the inner circumferential face of the ring leaving a narrow portion 20 of the lower radial face of the end segment 12a intact between it and the inner circumferential face of the ring (FIG. 6A). Thus, neither the surface 14 nor the surface 18 creates a direct pathway for fluids interconnecting the inner and outer circumferential faces of the ring. Again, while the angle of inclination is illustrated as being 45°, this is not essential so long as no direct path for fluids is created between these abutting surfaces which path would extend between the inner and outer radial faces of the ring.

Figure 5:
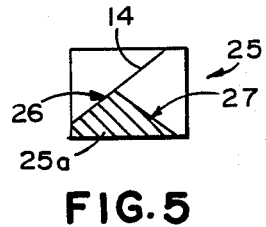
FIG. 5 is a sectional elevation view taken along the plane V—V of FIG. 2.
Figure 5A:
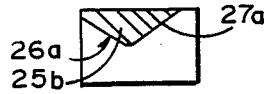
Figure 8:
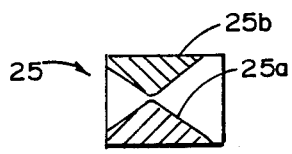
FIG. 8 is a sectional elevation view taken along the plane VIII—VIII of FIG. 3.
Figure 9:
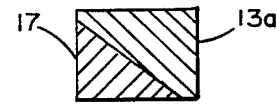
FIG. 9 is a sectional elevation view taken along the plane IX—IX of FIG. 3.

It will be obvious from the above description that the surfaces 14 and 18 are both inclined and face in opposite directions. They also are circumferentially spaced. Between them is an intermediate section 25 in which the cross-sectional shape of both the first segment 25a and of the second segment 25b are identical and of generally triangular shape (FIGS. 5, 5A and 8). The radial outer face 26 of the first segment 25a forms a circumferential extension of the lower portion of the inclined surface 14 and has the same inclination. The radial inner face 27 of the first segment 25a forms a circumferential extension of the inwardly facing inclined surface 18 of the second finger 17. Preferably, the inclination of these surfaces is such that they intersect at or substantially at the geometric center of the ring's cross section.

The end segment 12a is of the same design and shape as end segment 12 except the direction in which the respective surfaces face and slope is reversed. Thus, the fingers 13 and 17a are complementary and the fingers 17 and 13a are complementary. The complementary surfaces seat against each other to control leakage past the ring. The first and second segments 25a and 25b of the intermediate sections are alike in cross section, axially aligned and inverted with respect to each other (FIG. 8). It will be noted that the apices of the first and second segments 25a and 25b of the intermediate section 25 are slightly truncated to prevent them from actually contacting each other which could cause axial misalignment of the end segments 12 and 12a (FIG. 8).

Figure 10:
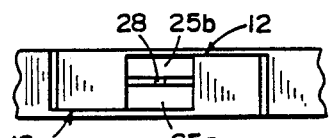
FIG. 10 is a fragmentary elevation view of the outside face of the ring at the splice when fully closed.
Figure 11:
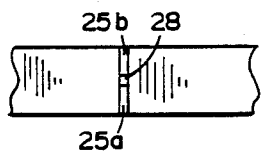
FIG. 11 is a view similar to FIG. 10 but illustrating the inside surface at the splice.
Figure 12:
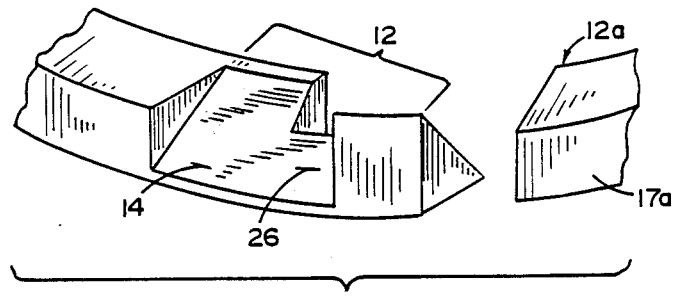
FIG. 12 is a fragmentary oblique view of the ring splice in open condition.

The minimum circumferential length of the intermediate section must be such that when the ring is compressed from its initial interlocking position to the condition which prevails when seated within the cylinder it is sealing there remains the possibility of some reduction in diameter to prevent lock-up. However, the length of the ring is such that the resulting gap or opening 28 is very small when the ring is finally seated in its groove as is indicated in FIGS. 10 and 11. The illustration of it in FIGS. 10 and 11 is much enlarged, solely for the purpose of clarity.

Figure 13:
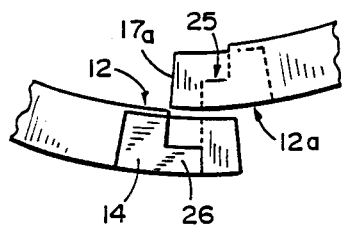
FIG. 13 is a fragmentary view of a modification of the ring splice.
Figure 2:
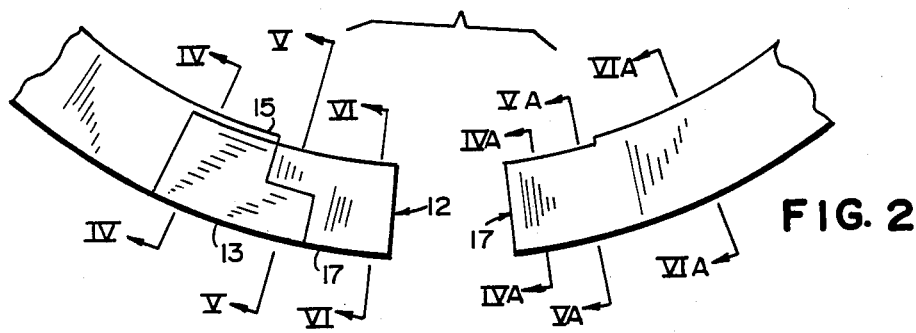
FIG. 2 is an enlarged, fragmentary top view of the splice or gap in the ring in open condition.
Figure 3:
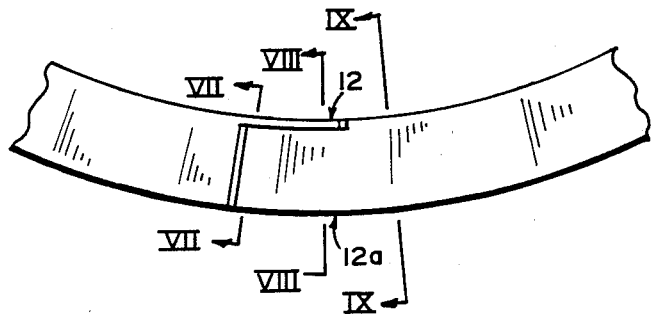
FIG. 3 is a fragmentary view similar to FIG. 2 with the ring in closed condition.

If the circumferential length of the intermediate section of the end segments is less than the length of the first fingers 13 and 17a, to close the gap between the ends of the ring by hooking the two first fingers behind each other, it will be necessary to displace the ends axially sufficiently for one to pass over the other. This will require a ring groove having substantially greater depth than otherwise required to allow the ring to be necklaced or positioned sufficiently eccentrically of the shaft or other body on which it is being mounted to allow the necessary axial twisting without interference with the side walls of the ring groove. In many cases, this may not be desirable. Widening the groove is unacceptable because that will defeat the purpose of the ring. To overcome this, at least one of the intermediate sections can be made long enough to permit the first fingers to be moved past each other with significantly reduced axial displacement (FIG. 13). Thus, the depth of the ring groove can be significantly reduced without interfering with ring installation.

It is important to the effectiveness of this seal that, except for the gap 28, no pair of complementary or nesting surfaces provide a straight or non-tortuous path between the inner and outer faces of the seal. All of the overlapping and interengaging surfaces formed by the splice, except the central gap 28, extend from the outer radial face to one of the axial faces. Thus, all of them have what amounts to a closed end. Actually, even the gap 28 is largely isolated by the fact that at the outer face of the ring it is entirely surrounded by portions of the ring face which are resiliently seated against the wall of the bore within which the ring is confined. The result is a very effective seal whether the motion between the ring and the bore surface against which it is seated is rotary or reciprocal or a combination of both.

The design of the ring has manufacturing as well as functional advantages. Because all of the interengaging surfaces which form the splice are accessible from either the top or the bottom of the ring and involve surfaces which are relatively easy to machine with precise but not complex tooling and involve no undercuts or secondary machining operations, end segments can be rapidly and very accurately formed with minimal tolerance accumulation on fully automatic, high speed tools. This is not only a cost advantage, it contributes significantly to the ring's accuracy and, therefore, to its effectiveness.

Having described a preferred embodiment of the ring and a modification thereof, it will be understood that other modifications of the invention can be made. Such modifications which do not depart from the principles of the invention are to be considered as included in the hereinafter appended claims, unless the language of the claims clearly states otherwise.

I claim:

1. Means for connecting the ends of a split sealing ring, said means including overlapping, interlocking latch portions which portions are identical in cross section except that the overlapping portions and recesses thereof on one end are complementary to and interfit with the recesses and overlapping portions respectfully of the other end, the circumferential outer ends of said latch portions being axially extending fingers, the outer radial faces of which form a part of the circumferential outer face of the ring, said fingers each being circumferentially spaced from the adjacent body of the ring by a radially outwardly facing recess opening through the outer circumferential face of said ring; said recesses at said outer face having an axial depth less than that of the ring; the recess of one end having a radially inwardly and axially inclined surface intersecting the outer circumferential ring face adjacent to but spaced from one axial face of said ring and intersecting the opposite axial face of said ring adjacent to but spaced from the inner circumferential face of said ring, the recess of the other end of said ring having an inclined surface identical to that of said one end except it is so inclined that it intersects the outer circumferential face of the ring adjacent to but spaced from the other axial face of said ring and intersects said axial face of said ring adjacent to but spaced from the inner circumferential face of said ring, the inner faces of said fingers being inclined in directions opposite from each other, each being complementary to seat against the inclined surface of the recess formed in the opposite end of the ring which separate the finger of that end from the main body of the ring, the circumferential lengths of said recesses separating said fingers from the main body of said ring being greater than the circumferential length of said fingers whereby when said ring is compressed such that the ends of said fingers are seated against the opposite ends of said recess a circumferentially outwardly facing gap is formed in the outer radial face of said ring, a portion of each of said radially outwardly inclined faces adjacent the finger terminating adjacent to but not touching the midpoint between the ring's axial faces to eliminate axial interference between them, the radially outwardly facing inclined faces having a combined circumferential length less than that of the gap and the width between their ends being only that necessary to prevent the circumferentially facing ends of said inclined faces from making abutting contact.

2. Means for connecting the ends of a split sealing ring as described in claim 1 wherein each of said first surfaces intersects both the outer circumferential face of the ring and one of the axial faces of the ring at a point spaced from the adjacent edge of said face whereby the plane along which said first surfaces abut extends in an axial direction only.

3. Means for connecting the ends of a split sealing ring, said means comprising interlocking latch portions, each of said latch portions terminating in an axially extending finger, a circumferentially extending recess adjacent to and longer than the circumferential width of said finger, each of said recesses having a radial face inclined to the axis of said ring and intersecting one axial face and an outer radial face of said ring, each of said fingers having a radial face inclined to seat against and form a seal with the radial face of the recess in the other end of said ring, said recesses being longer than the circumferential width of said fingers whereby a gap is formed in the outer radial face of said ring between adjacent circumferential faces of said fingers when said ring is circumferentially compressed, said inclined radial faces having portions substantially circumferentially bridging the gap between said fingers when the ring is fully compressed, said portions having apices which axially align and are spaced apart only enough to avoid actual interference whereby the gap between said apices is the only opening remaining at the interface of said latch portions which extends from the inner to the outer radial faces of said ring.

4. Means for connecting the ends of a split sealing ring, said ends forming a latch with each of said ends circumferentially having an inner portion, an outer portion and an intermediate portion, said outer portions having radially oppositely facing surfaces, said inner portions also having radially oppositely facing surfaces, all of said radially facing surfaces being inclined to the axis of said ring with the inclined surface of each outer portion of one end being complementary to and seated against the inclined surface of the inner portion of the other end of said ring, each of the planes along which said inclined surfaces seat against each other at one of its ends intersecting the outer radial face of said ring at a point spaced from either axial face of the ring and also an axial face of the ring at a point spaced radially from the inner axial face of the ring; said inner portions each having oppositely inclined surfaces forming opposing apices of an axial length reduced only enough to prevent contact therebetween whereby when the ring is compressed to operating diameter the clearance between said apices being the only radial path for fluids interconnecting the inner and outer faces of said ring.

5. Means for connecting the ends of a split sealing ring as described in claim 4 wherein the gap formed by the ends of the ring when its ends are latched and the ring compressed to operating diameter is entirely circumscribed by the outer circumferential face of said ring.

6. Means for connecting the ends of a split sealing ring as described in claim 4 wherein said inner and outer portion are circumferentially longer than said inner portions whereby the outer portion of one end must be axially displaced to permit said ends to be latched.

7. Means for connecting the ends of a split sealing ring as described in claim 4 wherein the circumferential length of at least one of said inner portions is long enough to allow the outer portion of the other end to pass radially through it as the ends of the latch are engaged.

* * * * *